United States Patent [19]

Ohno

[11] Patent Number: 5,710,670

[45] Date of Patent: Jan. 20, 1998

[54] WIDE ANGLE ZOOM LENS SYSTEM

[75] Inventor: Kazunori Ohno, Saitama-ken, Japan

[73] Assignee: Fuji Photo Optical Co., Ltd., Saitama-ken, Japan

[21] Appl. No.: 420,342

[22] Filed: Apr. 11, 1995

[30] Foreign Application Priority Data

Apr. 11, 1994 [JP] Japan .................................. 6-072261

[51] Int. Cl.$^6$ .......................... G02B 15/14; G02B 13/18
[52] U.S. Cl. .............................. 359/691; 359/717
[58] Field of Search ........................... 359/691, 717, 359/686, 689

[56] References Cited

U.S. PATENT DOCUMENTS 5,357,374  10/1994  Ohno ............................... 359/691
5,381,269  1/1995  Estelle ............................. 359/691
5,473,473  12/1995  Estelle et al. ..................... 359/691

FOREIGN PATENT DOCUMENTS 5-164965  6/1993  Japan .

*Primary Examiner*—Scott J. Sugarman
*Attorney, Agent, or Firm*—Young & Thompson

[57] ABSTRACT

A zoom lens system comprises a front meniscus lens of negative power and a rear meniscus lens of positive power which are shifted along an optical axis of the zoom lens system to change a relative axial distance so as to achieve zooming continuously from a wide angle end to a telephoto end and satisfies the following condition:

$$1.85 < f_1/f_2 < -1.5$$

where $f_1$ and $f_2$ are the focal length of the front and rear meniscus lenses, respectively.

4 Claims, 6 Drawing Sheets

WIDE ANGLE ZOOM LENS SYSTEM

BACKGROUND OF THE INVENTION

1. Field of the Invention

The resent invention relates to a wide angle zoom lens system, and, more particularly, to a simple wide angle zoom lens system suitable for still cameras, such as compact cameras.

2. Description of Related Art

In recent years, it is more popular to eqip compact still cameras with zoom lenses. In order to maintain compactness, such a zoom lens is composed of two lens groups, namely a front lens of positive power group and a rear lens group of negative power. On the other hand, zoom lenses composed of a front lens group of negative power and a rear lens group of positive power are widely used as standard lenses for single lens reflex cameras. This is because such a single lens reflex camera which is equipped with a through-the-lens finder system including a quick-return reflex mirror needs a long space behind a taking lens system and a zoom lens of this type has proven to be an excellent optic as a standard lens having long back focal length. On the other hand, an example of such optics suitable for compact cameras is disclosed in Japanese Laid-Open Patent Publication No. 5 - 164965 filed by the applicant of this application where the zoom lens is composed of a front lens group of negative power and a rear lens group of positive power.

While the zoom lens composed of a positive power front lens group and a negative power rear lens group enables it easy to maintain compactness of the zoom lens, nevertheless, it is hard to achieve zooming only by large movements of the front and rear lens groups. This results in a large difference in lens speed or f-number between wide angle photography and tele-photography and, in particular, leads to constraints imposed on photographic conditions due to large f-numbers of the zoom lens even which has a high zooming ratio. In addition, the zoom lens needs a precise zooming mechanism which is always costly in manufacturing.

On the other hand, the zoom lens composed of a negative power front lens group and a positive power rear lens group is unable to maintain compactness of the zoom lens while avoiding difficulties such as described above, resulting in aggravation of compactness of a camera and irritating operations.

Although the zoom lens disclosed in Japanese Laid-Open Patent Publication No. 5 - 164965 has proposed a basic optical structure which dissolves the above-described drawbacks, it does not yet yield universal optical structure and satisfaction of compactness for compact still cameras.

SUMMARY OF THE INVENTION

It is an object of the present invention to provide a simple, wide angle zoom lens comprising two lens elements which is suitably used with compact still cameras and realizes low manufacturing costs.

The invention in one form thereof comprises a front a first or front meniscus lens element of negative power and a second or rear meniscus lens element of positive power. The front and rear meniscus lens elements are movable relatively to each other along the optical axis so as to change continuously the focal length for zooming. The zoom lens embodying the present invention may be designed for various focal length ranges by satisfying the following condition:

$$1.85 < f_1/f_2 < -1.5$$

where $f_1$ and $f_2$ are the focal length of the front and rear meniscus lenses, respectively.

The zoom lens embodying the present invention preferably has aspheric surfaces, one or more surfaces on the front and rear lens elements, as will be made apparent from the examples in the following tables. The aspheric surface may be defined by the following equation:

$$X = Cy^2/(1 + \sqrt{1 - (1+K)C^2y^2}) + a_1y^4 + a_2y^6 + a_3y^8 + a_4y^{10}$$

where
X is the surface sag at a semi-aperture distance y from the optical axis X of the zoom lens system;
C is the curvature of a lens surface at the optical axis X equal to the reciprocal of the radius at the optical axis;
K is a conic constant;
a1–a4 are aspheric coefficients.

From the fact that a lens system comprising two lens groups, such as a front lens group of negative power and a rear lens group of positive power, has proved that such an optic is suitable for a wide angle lens system which has relatively short focal length, a wide angle zoom lens comprising two single lens elements yields overall compactness of the zoom lens system as well. However, a wide angle zoom lens system of this type increases aggravation of various aberrations such as, in particular, field curvature, distortion and magnification chromatic aberrations. Accordingly, it is essential for the zoom lens system to reduce aggravation of these aberrations with less changes in these aberrations during zooming.

In the zoom lens system comprising a front lens element of negative power and a rear lens element of positive power according to the present invention, in order to suppress changes in aberrations, a lens stop is disposed behind the rear lens element. Together, in order for the zoom lens system to prevent off-axial rays of light from entering each of the front and rear lens elements at a large angle of incident, a meniscus lens is used as each of the front and rear lens elements. Although this optical arrangement needs a rear lens element with its both surfaces having small radii, using an aspheric meniscus lens element as the rear lens element remains suitably balanced aberrations, such as spherical aberration and coma, of the zoom lens system. In addition, using glass materials having relatively low dispersion for the front meniscus lens element enables the zoom lens system to have reduced magnification chromatic aberrations.

The parameter set forth is necessary for favorable optical performance of the zoom lens system comprising a front lens element of negative power and a rear lens element of positive power. Because the relative axial position of the optical elements including a lens stop is great importance with regard to distortion caused due to an increased angle of view of the zoom lens system and because changes of the focal length of the zoom lens system is ruled by the focal length of each of the front and rear lens elements. Satisfaction of the parameter ensures a compact zoom lens with well corrected aberrations. If the lower limit is exceeded, the power of each of the front and rear lens elements relative to the focal length of the zoom lens system is weakened at a wide angle end, leading to the zoom lens system with an increased diameter and an elongated overall length while remaining well corrected distortion. On the other hand, if the upper limit is exceeded, the power of each of the front and rear lens elements relative to the focal length of the zoom lens system becomes strong at the wide angle end, leading to small surface radii and enhanced aberrations of the rear lens element even though the rear lens element is aspheric.

BRIEF DESCRIPTION OF THE DRAWINGS

The above and other objects and features of the present invention will be clearly understood from the following description with respect to a preferred embodiment thereof when considered in conjunction with the accompanying drawings, in which.

DETAILED DESCRIPTION OF THE PREFERRED EMBODIMENTS

In the following prescription tables where various versions of the invention are set forth, the reference L followed by an arabic numeral indicates the lens element progressively from the object end to the image end of the photographic lens system. The reference S followed by an arabic numeral indicates the lens surface progressively from the object end to the image end of the zoom lens system. The reference radius numbers R are the progressive lens surface radii. The reference d is the progressive axial distance between adjacent surfaces. Nd is the index of refraction of the lens element. ν is the dispersion of the lens element as defined by the Abbe number. The references $f_1$ and $f_2$ are the focal length of the front and rear lens elements L1 and L2, respectively. Ld is the overall length of the zoom lens system and the references FL or $F_W$ and $F_T$ are the overall focal length of the zoom lens system at the shortest distance end or wide angle end (EDW) and the longest distance end or telephoto end (EDT), respectively. BF is the back focal length of the zoom lens system. F and 2ω are the lens speed (f-number) and the angle of view, respectively.

FIGS. 1A–1C to 3A–3C show various versions of an embodiment of the present invention in which the zoom lens system is composed of two single lens elements which are moved relative to each other along the optical axis to achieve zooming between a wide angle photographic end y and a tele-photographic end.

Figure 1A:
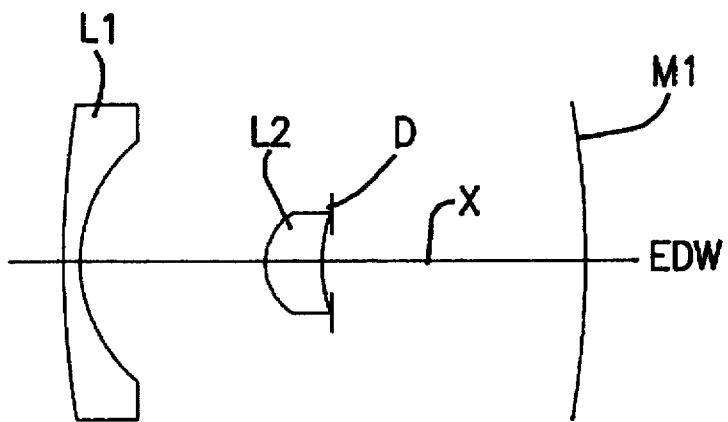
FIGS. 1A–1C are schematic side view of a zoom lens system according to a version of an embodiment of the present invention.
Figure 1B:
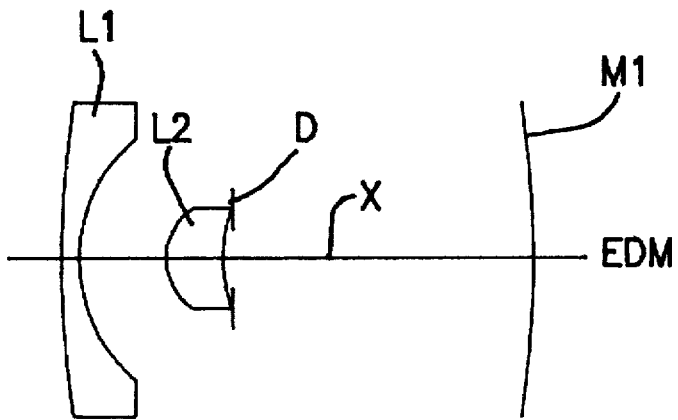
Figure 1C:
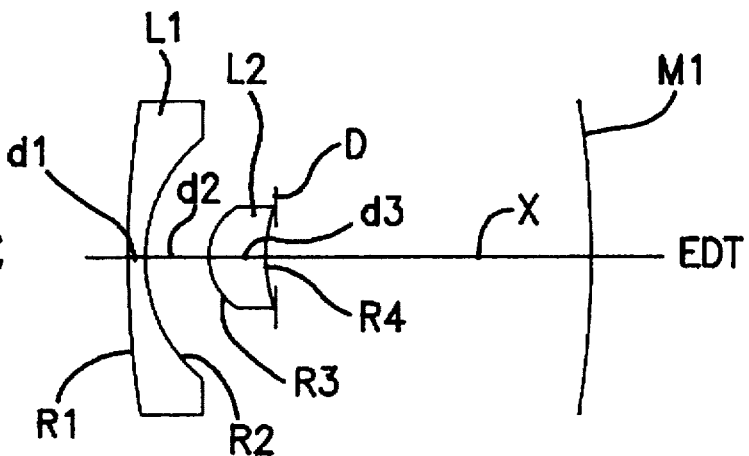

In the front version of the embodiment shown in FIGS. 1A–1C, the zoom lens system comprises two single lens elements, namely a front meniscus lens element L1 of negative power having an image end surface concave relative to a curved image surface M1 having a radius of –400 mm and a rear meniscus lens element L2 of positive power having a convex object end surface. Both surfaces of the rear lens element L2 are aspheric. The zoom lens system further has a diaphragm or lens stop D positioned at a distance of approximately 0.7 mm behind from the image end surface of the rear lens element L2. The front and rear lens elements L1 and L2 move in opposite directions during zooming. The zoom lens system L2 and lens stop D are adapted to be shifted along the optical axis X as a group during zooming, but in fixed relation to each other during zooming. Specifically, during zooming toward the tele-photography end (EDT) from the wide angle photography (EDW) via the in-between intermediate position (EDM), the front lens element L1 moves toward the image end and the lens element L2 moves toward the object end.

The zoom lens system as shown in FIGS. 1A–1C scaled to an image frame of 24×36 mm is substantially described in Table I.

TABLE I

| Element | Radius of Curvature (mm) | Axial Distance Between Surfaces (mm) | Nd | ν |
|---|---|---|---|---|
| L1 | S1  $R_1$ = 94.310 | | | |
| | | $d_1$ = 1.5 | 1.49116 | 57.6 |
| | S2  $R_2$ = 13.333 | | | |
| | | $d_2$ = variable | | |
| L2 | S3  $R_3$ = 5.258 | | | |
| | | $d_3$ = 4.499 | 1.49116 | 57.6 |
| | S4  $R_4$ = 9.628 | | | |

Aspheric Surface: S3 and S4
Aspheric Parameters:

| | S3 | S4 |
|---|---|---|
| C | 0.190186 | 0.10386 |
| K | –0.26458 | 4.53346 |
| a1 | –0.22457 × 10$^{-4}$ | –0.56536 × 10$^{-3}$ |
| a2 | 0.83591 × 10$^{-4}$ | 0.18961 × 10$^{-2}$ |
| a3 | –0.74073 × 10$^{-5}$ | –0.10037 × 10$^{-2}$ |
| a4 | 0.34929 × 10$^{-6}$ | 0.19060 × 10$^{-3}$ |

Zooming Parameters:

| | FL (mm) | BF (mm) | F | 2ω | $d_2$ | Ld |
|---|---|---|---|---|---|---|
| EDW | 21.00 | 24.28 | 8.5 | 91.7° | 15.36 | 45.64 |
| EDM | 29.73 | 30.61 | 10.0 | 72.1° | 7.53 | 42.64 |
| EDT | 35.00 | 33.54 | 11.4 | 63.4° | 4.69 | 42.72 |

The zoom lens system depicted in FIGS. 1A–1C and described in Table I has the following parameters described as follows:

| f1 | f2 | f1/f2 | β = $F_T/F_W$ |
|---|---|---|---|
| –31.81 | 17.62 | –1.8053 | 1.6667 |

As apparent from the above, the zoom lens system shown in FIGS. 1A–1C satisfies the condition.

Figure 4A:
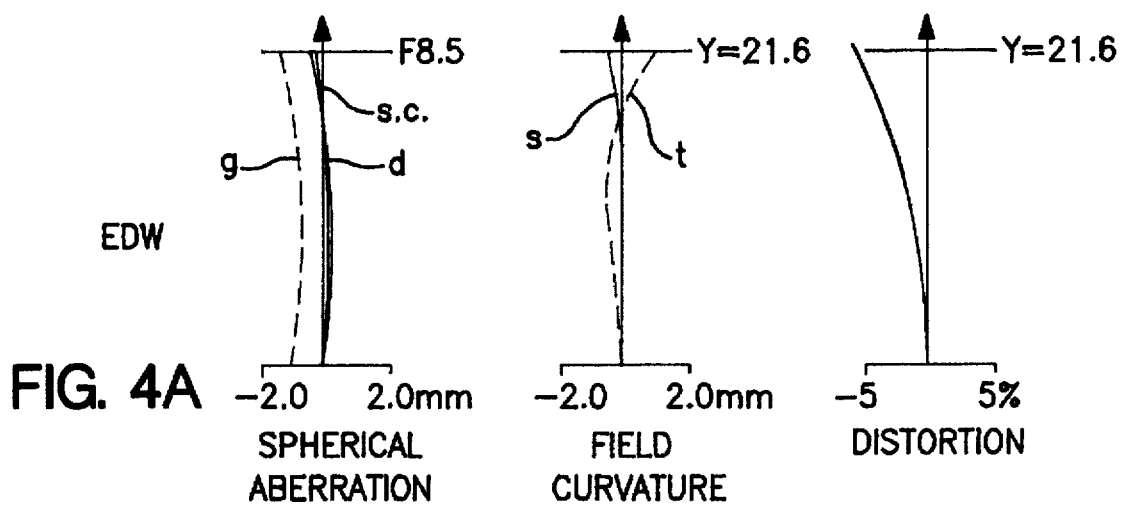
FIGS. 4A–4C show diagrams of aberrations of the zoom lens system of FIG. 1.
Figure 4B:
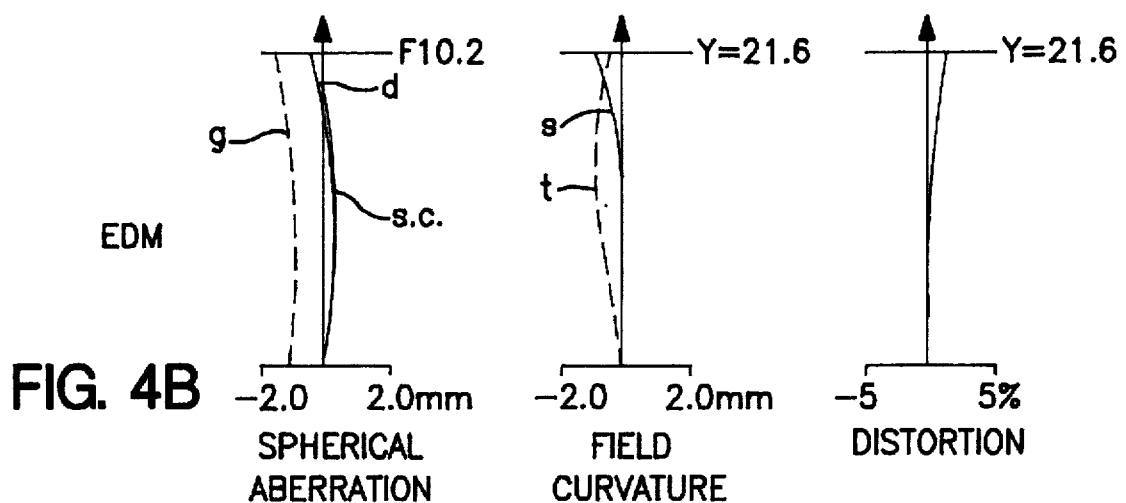
Figure 4C:
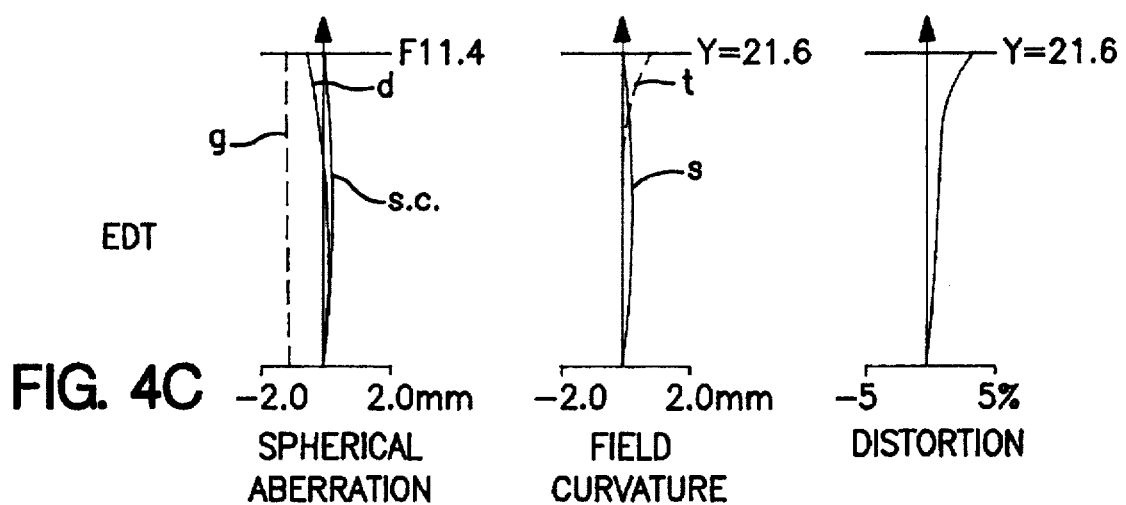

FIGS. 4A–4C shows diagrams illustrating aberrations, such as spherical aberration, field curvature and distortion of the zoom lens system shown in FIGS. 1A–1C at the wide angle end (EDW), the in-between intermediate position (EDM) and the tele-photo end (EDT). As apparent in FIGS. 2A–2C, the zoom lens system has superior correction for these aberrations.

Figure 2A:
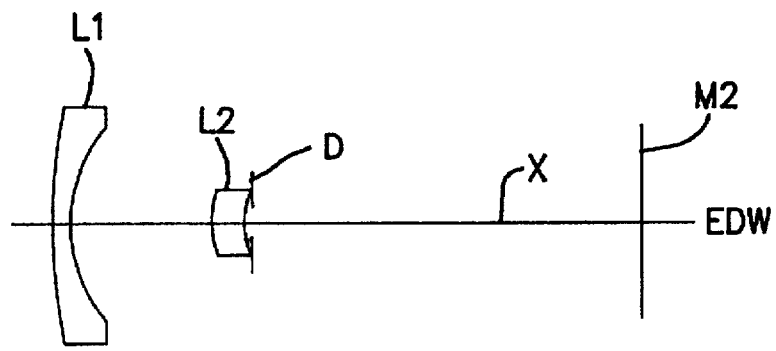
FIGS. 2A–2C are schematic side view of a zoom lens system according to another version of the embodiment of the present invention.
Figure 2B:
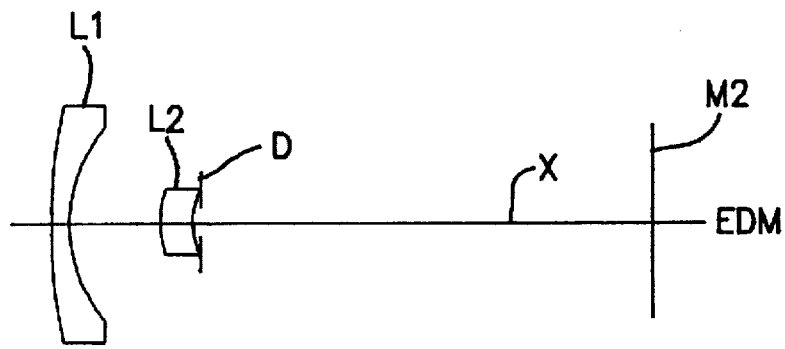
Figure 2C:
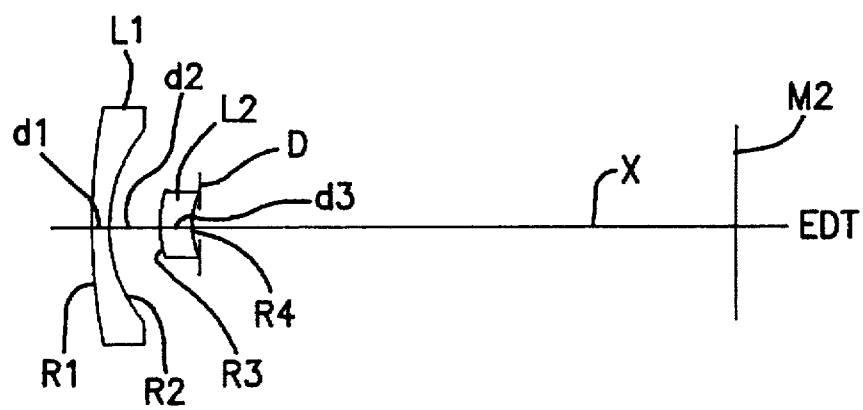

Referring to FIGS. 2A–2C which shows another version of the embodiment of the present invention, a zoom lens system comprises a front meniscus lens element L1 of negative power having a concave image end surface and a rear meniscus lens element L2 of positive power having a convex object end surface. Both surfaces of each of the front and rear lens elements L2 and L2 are aspheric. The zoom lens system further has a lens stop D positioned at a distance of approximately 0.5 mm behind from the image end surface of the lens element L2. The front and rear lens elements L1 and L2 move in opposite directions so as to decrease the axial distance between them during zooming toward the tele-photography end (EDT) from the wide angle photography end (EDW) via the in-between intermediate position (EDM). The zoom lens system L2 and lens stop D are adapted to be shifted along the optical axis X as a group during zooming, but in fixed relation to each other during zooming. In this instance, The zoom lens system forms sharp images on an approximately flat surface M2.

The zoom lens system as shown in FIGS. 2A-2C scaled to an image frame of 24×36 mm is substantially described in Table II.

TABLE II

| Element | Radius of Curvature (mm) | Axial Distance Between Surfaces (mm) | Nd | υ |
|---|---|---|---|---|
| L1 | S1 $R_1 = 37.406$ | $d_1 = 1.5$ | 1.49116 | 57.6 |
|  | S2 $R_2 = 10.025$ | $d_2$ = variable |  |  |
| L2 | S3 $R_3 = 4.207$ | $d_3 = 2.270$ | 1.49116 | 57.6 |
|  | S4 $R_4 = 6.759$ |  |  |  |

Aspheric Surface: S1, S2, S3 and S4
Aspheric Parameters:

|  | S1 | S2 | S3 | S4 |
|---|---|---|---|---|
| C | 0.02674 | 0.09975 | 0.23770 | 0.14795 |
| K | 3.40389 | −0.22785 | 1.28056 | 6.74359 |
| a1 | $-0.48894 \times 10^{-4}$ | $0.10231 \times 10^{-3}$ | $-0.93197 \times 10^{-3}$ | $0.24192 \times 10^{-2}$ |
| a2 | $-0.96192 \times 10^{-7}$ | $-0.12487 \times 10^{-5}$ | $-0.18598 \times 10^{-3}$ | $-0.25293 \times 10^{-2}$ |
| a3 | 0 | $-0.70536 \times 10^{-8}$ | $0.61481 \times 10^{-5}$ | $0.13952 \times 10^{-2}$ |
| a4 | 0 | 0 | $-0.46908 \times 10^{-5}$ | $-0.24267 \times 10^{-3}$ |

Zooming Parameters:

|  | FL (mm) | BF (mm) | F | 2ω | $d_2$ | Ld |
|---|---|---|---|---|---|---|
| EDW | 26.00 | 30.49 | 10.2 | 79.5° | 10.62 | 44.88 |
| EDM | 32.96 | 34.78 | 11.64 | 66.6° | 6.58 | 45.14 |
| EDT | 45.00 | 42.23 | 13.8 | 51.4° | 2.53 | 48.54 |

The zoom lens system depicted in FIG. 2 and described in Table II has the following parameters described as follows:

| f1 | f2 | f1/f2 | β = $F_{T/FW}$ |
|---|---|---|---|
| −28.40 | 17.54 | −1.6192 | 1.731 |

As apparent from the above, the zoom lens system shown in FIGS. 2A-2C satisfies the condition.

Figure 5A:
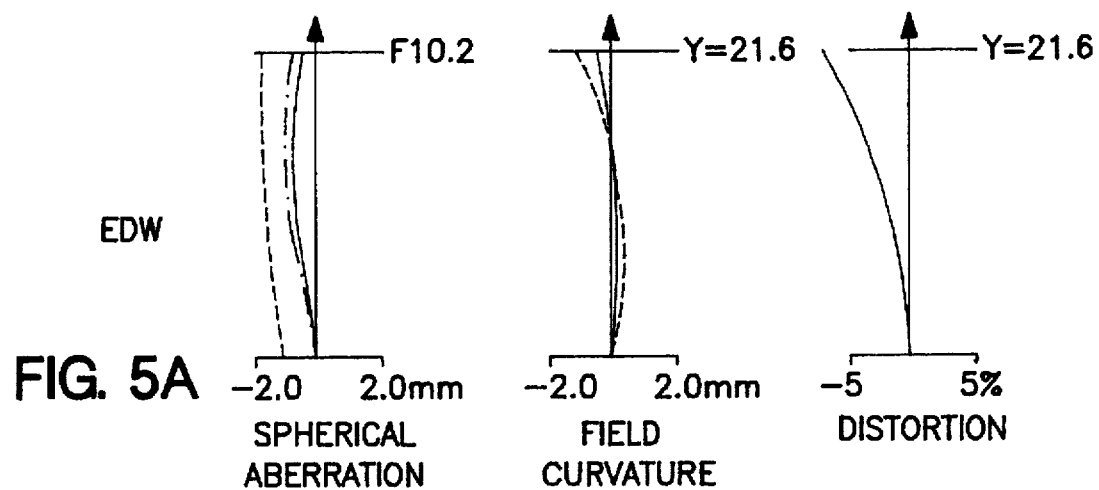
FIGS. 5A–5C show diagrams of aberrations of the zoom lens system of FIG. 2.
Figure 5B:
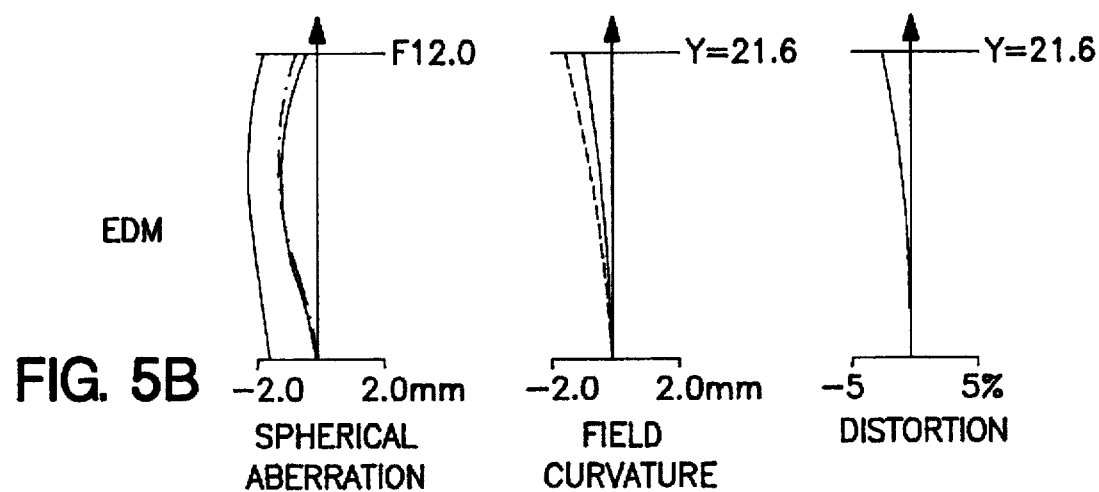
Figure 5C:
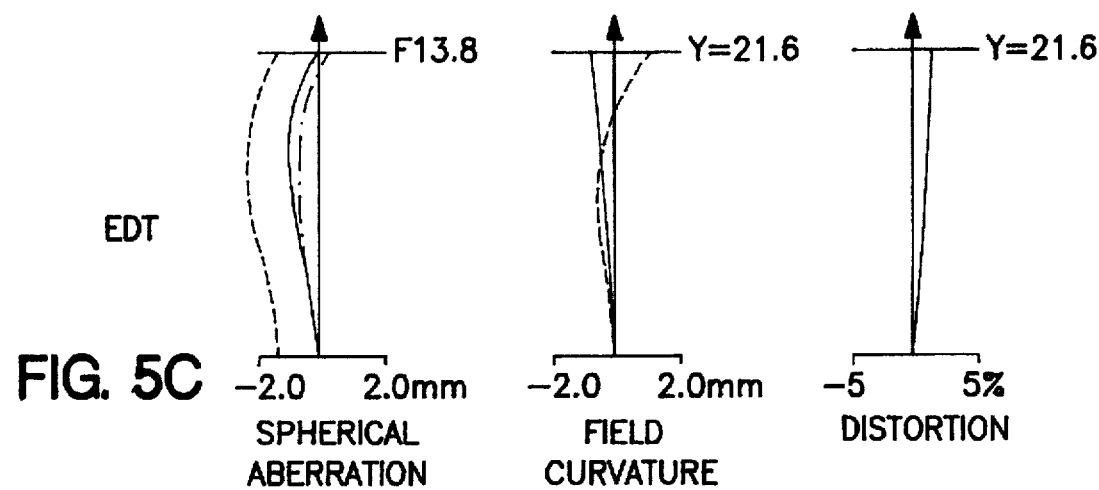

FIGS. 5A-5C show diagrams illustrating aberrations, including spherical aberration, field curvature and distortion of the zoom lens system shown in FIGS. 2A-2C at the wide angle end (EDW), the in-between intermediate position (EDM) and the tele-photo end (EDT). As apparent in FIGS. 5A-5C, the zoom lens system has superior correction for these aberrations.

Figure 3A:
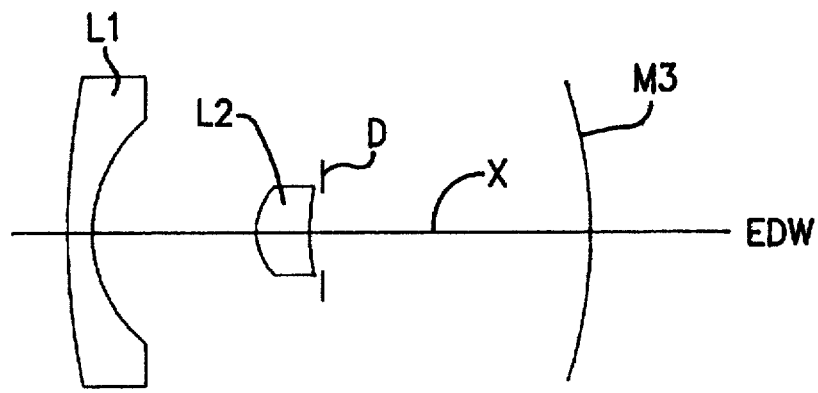
FIGS. 3A–3C are schematic side views of a zoom lens system according to still another version of the embodiment of the present invention.
Figure 3B:
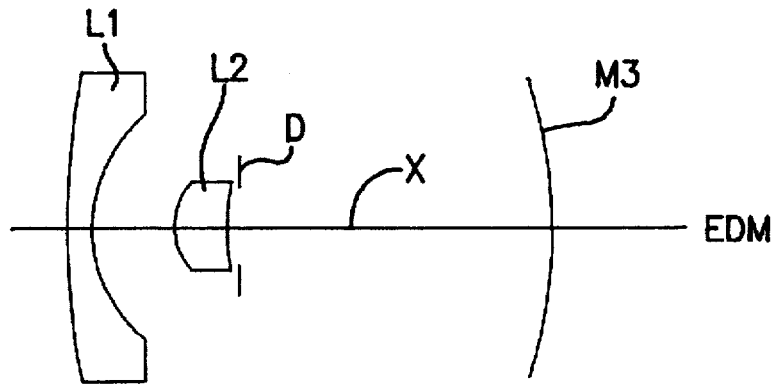
Figure 3C:
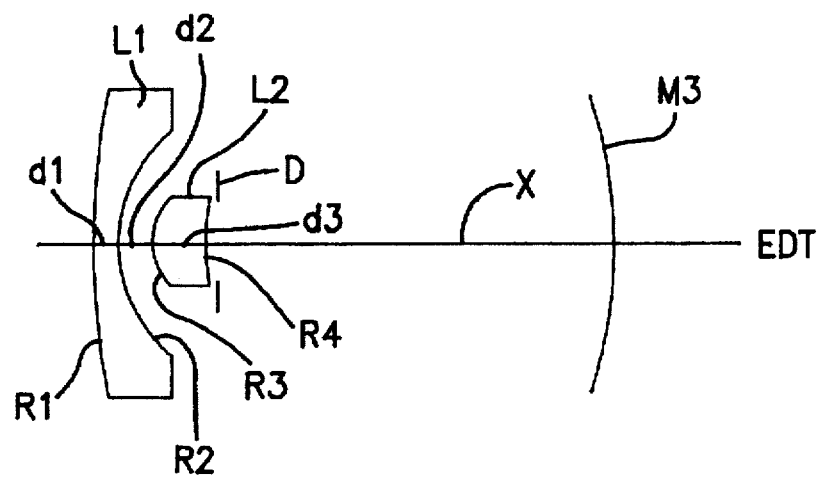

FIGS. 3A-3C show a further version of the embodiment of the present invention. A zoom lens system comprises a front meniscus lens element L1 of negative power having a concave surface relative to a curved image surface M3 and a rear meniscus lens element L2 of positive power having a convex object end surface. Both surfaces of the rear lens element L2 are aspheric. A lens stop D is positioned at a predetermined distance behind from the image end surface of the lens element L2. Both surfaces of the rear lens element L2 are aspheric. The zoom lens system further has a diaphragm or lens stop D positioned at a distance of approximately 0.7 mm behind from the image end surface of the rear lens element L2. The front lens element L1 is substantially stationary with respect to the zoom lens system. The rear lens element L2 and fixed lens stop D are adapted to be shifted along the optical axis X as a group during zooming, but in fixed relation to each other during zooming. The zoom lens system forms sharp images on the curved image surface M3 having a radius of −400 mm.

The zoom lens system as shown in FIGS. 3A-3C scaled to an image frame of 24×36 mm is substantially described in Table III.

TABLE III

| Element | Radius of Curvature (mm) | Axial Distance Between Surfaces (mm) | Nd | υ |
|---|---|---|---|---|
| L1 | S1 $R_1 = 50.4$ | $d_1 = 1.5$ | 1.49116 | 57.6 |
|  | S2 $R_2 = 9.808$ | $d_2$ = variable |  |  |
| L2 | S3 $R_3 = 4.554$ | $d_3 = 3.866$ | 1.49116 | 57.6 |
|  | S4 $R_4 = 9.138$ |  |  |  |

Aspheric Surface: S3 and S4
Aspheric Parameters:

|  | S3 | S4 |
|---|---|---|
| C | 0.219587 | 0.10943 |
| K | 0.27841 | 4.63573 |
| a1 | $-0.91474 \times 10^{-3}$ | $-0.28051 \times 10^{-3}$ |
| a2 | $0.14263 \times 10^{-3}$ | $0.20679 \times 10^{-2}$ |
| a3 | $-0.18187 \times 10^{-4}$ | $-0.11558 \times 10^{-2}$ |
| a4 | $0.73193 \times 10^{-6}$ | $0.24183 \times 10^{-3}$ |

Zooming Parameters:

|  | FL (mm) | BF (mm) | F | 2ω | $d_2$ | Ld |
|---|---|---|---|---|---|---|
| EDW | 18.00 | 20.80 | 8.5 | 100.5° | 11.801 | 37.96 |
| EDM | 23.83 | 24.15 | 10.02 | 84.5° | 6.868 | 36.38 |
| EDT | 35.00 | 30.59 | 11.5 | 63.4° | 2.003 | 37.96 |

The zoom lens system depicted in FIGS. 6A-6C and described in Table III has the following parameters described as follows:

| f1 | f2 | f1/f2 | β = $F_T/F_W$ |
|---|---|---|---|
| −25.10 | 14.47 | −1.7346 | 1.9444 |

As apparent from the above, the zoom lens system shown in FIGS. 3A-3C satisfies the condition.

Figure 6A:
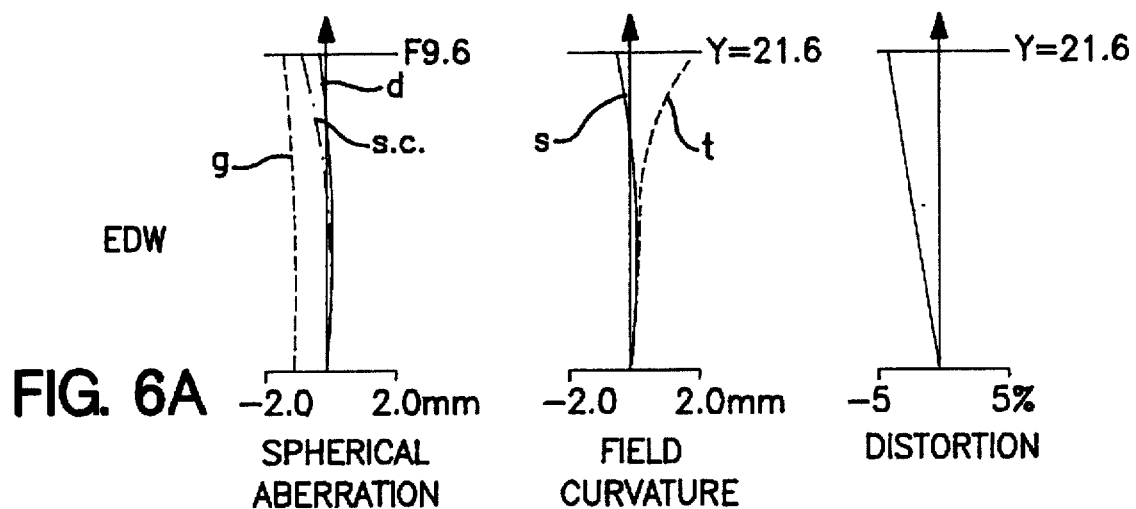
FIGS. 6A–6C show diagrams of aberrations of the zoom lens system of FIG. 3.
Figure 6B:
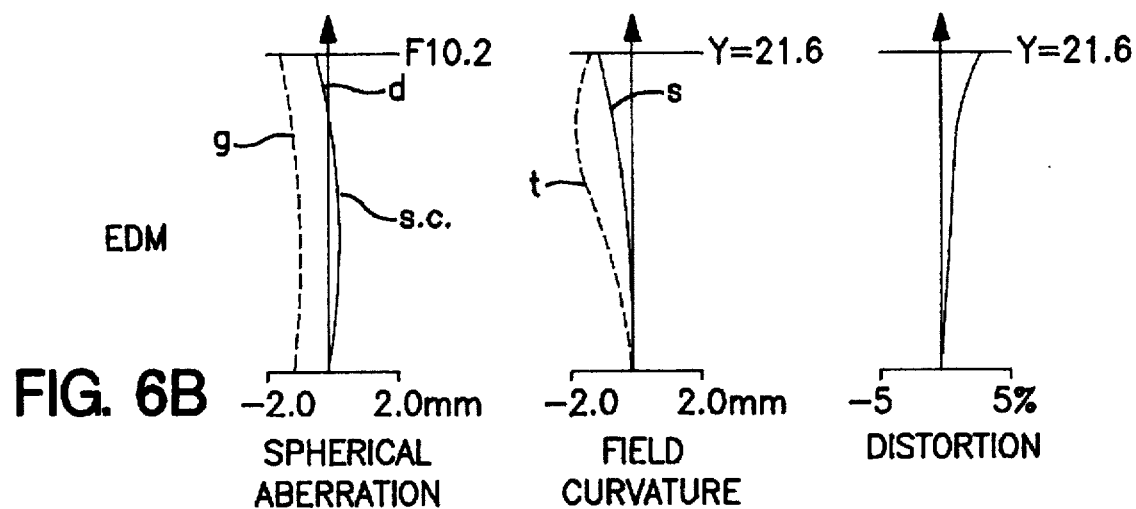
Figure 6C:
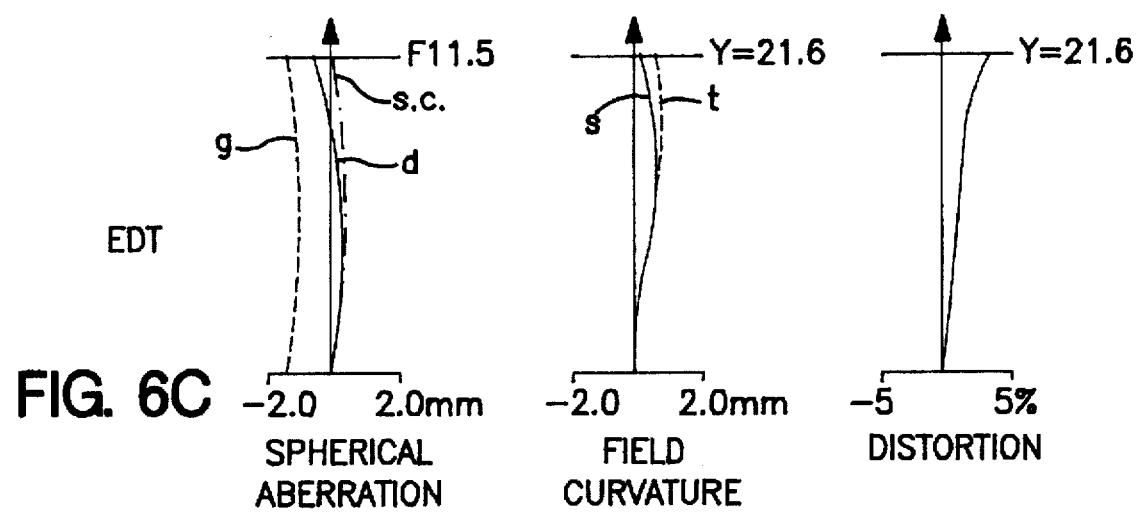

FIGS. 6A-6C show diagrams illustrating aberrations, including spherical aberration, field curvature and distortion of the zoom lens system shown in FIGS. 3A-3C at the wide angle end (EDW), the in-between intermediate position and the tele-photo end (EDT). As is apparent in FIGS. 6A-6C, the zoom lens system has superior correction for these aberrations.

It is to be understood that although the present invention has been described with regard to preferred embodiments thereof, various other embodiments and variants may occur to those skilled. in the art, which are within the scope and spirit of the invention, and such other embodiments and variants are intended to be covered by the following claims.

What is claimed is:

1. A zoom lens system comprising in order from the object end to the image end a front meniscus lens element of negative power and a rear meniscus lens element of positive power, the front and rear meniscus lens elements being shifted along an optical axis of the zoom lens system to change a relative axial distance between the front and rear meniscus lens elements so as to achieve zooming continuously from a wide angle photographic end to a telephotographic end, the zoom lens system satisfying the following condition:

$$-1.85 < f_1/f_2 < -1.5$$

where $f_1$ and $f_2$ are the focal length of the front and rear meniscus lenses, respectively, wherein said rear meniscus lens element has an object end aspheric surface and an image end aspheric surface, each aspheric surface being defined by the following relationship:

$$X = Cy^2/(1 + \sqrt{1 - (1+K)C^2y^2}) + a_1y^4 + a_2y^6 + a_3y^8 + a_4y^{10}$$

where X is the surface sag at a semi-aperture distance y from the optical axis X of the lens system, C is the curvature of a lens surface at the optical axis X equal to the reciprocal of the radius at the optical axis, K is a conic constant, and a1–a4 are aspheric coefficients, said zoom lens system being scaled to an image frame of 24×36 mm substantially as follows:

| Element | Radius of Curvature (mm) | Axial Distance Between Surfaces (mm) | Nd | ν |
|---|---|---|---|---|
| L1 S1 | $R_1$ = 94.310 | $d_1$ = 1.5 | 1.49116 | 57.6 |
| L1 S2 | $R_2$ = 13.333 | $d_2$ = variable | | |
| L2 S3 | $R_3$ = 5.258 | $d_3$ = 4.499 | 1.49116 | 57.6 |
| L2 S4 | $R_4$ = 9.628 | | | |

Aspheric Surface: S3 and S4
Aspheric Parameters:

| | S3 | S4 |
|---|---|---|
| C | 0.190186 | 0.10386 |
| K | −0.26458 | 4.53346 |
| a1 | −0.22457 × 10$^{-4}$ | −0.56536 × 10$^{-3}$ |
| a2 | 0.83591 × 10$^{-4}$ | 0.18961 × 10$^{-2}$ |
| a3 | −0.74073 × 10$^{-5}$ | −0.10037 × 10$^{-2}$ |
| a4 | 0.34929 × 10$^{-6}$ | 0.19060 × 10$^{-3}$ |

Zooming Parameters:

| | FL (mm) | $d_2$ | Ld |
|---|---|---|---|
| EDW | 21.00 | 15.36 | 45.64 |
| EDM | 29.73 | 7.53 | 42.64 |
| EDT | 35.00 | 4.69 | 42.72 | where the zoom lens system comprises lens elements L1 and L2 having surfaces S1 and S4 and surface radii R1 and R4, $d_1$ to $d_3$ are the axial distances, the index of refraction is given by Nd, the dispersion is defined by the Abbe No. as given by ν, FL is the overall focal length of the zoom lens system for the wide angle end (EDW), the middle position (EDM) and the telephoto end (EDT).

2. A zoom lens system comprising in order from the object end and to the image end a front meniscus lens element of negative power and a rear meniscus lens element of positive power, the front and rear meniscus lens elements being shifted along an optical axis of the zoom lens system to change a relative axial distance between the front and rear meniscus lens elements so as to achieve zooming continuously from a wide angle photographic end to a telephotographic end, the zoom lens system satisfying the following condition:

$$-1.85 < f_1/f_2 < -1.5$$

where $f_1$ and $f_2$ are the focal length of the front and rear meniscus lenses, respectively, wherein said rear meniscus lens element has an object end aspheric surface and an image end aspheric surface, each aspheric surface being defined by the following relationship:

$$X = Cy^2/(1 + \sqrt{1 - (1+K)C^2y^2}) + a_1y^4 + a_2y^6 + a_3y^8 + a_4y^{10}$$

where X is the surface sag at a semi-aperture distance y from the optical axis X of the lens system, C is the curvature of a lens surface at the optical axis X equal to the reciprocal of the radius at the optical axis, K is a conic constant, and a1–a4 are aspheric coefficients, said zoom lens system being scaled to an image frame of 24×36 mm substantially as follows:

| Element | Radius of Curvature (mm) | Axial Distance Between Surfaces (mm) | Nd | ν |
|---|---|---|---|---|
| L1 S1 | $R_1$ = 50.4 | $d_1$ = 1.5 | 1.49116 | 57.6 |
| L1 S2 | $R_2$ = 9.808 | $d_2$ = variable | | |
| L2 S3 | $R_3$ = 4.554 | $d_3$ = 3.866 | 1.49116 | 57.6 |
| L2 S4 | $R_4$ = 9.138 | | | |

Aspheric Surface: S3 and S4
Aspheric Parameters:

| | S3 | S4 |
|---|---|---|
| C | 0.219587 | 0.10943 |
| K | 0.27841 | 4.63573 |
| a1 | −0.91474 × 10$^{-3}$ | −0.28051 × 10$^{-3}$ |
| a2 | 0.14263 × 10$^{-3}$ | 0.20679 × 10$^{-2}$ |
| a3 | −0.18187 × 10$^{-4}$ | −0.11558 × 10$^{-2}$ |
| a4 | 0.73193 × 10$^{-6}$ | 0.24183 × 10$^{-3}$ |

Zooming Parameters:

| | FL (mm) | $d_2$ | Ld |
|---|---|---|---|
| EDW | 18.00 | 11.801 | 37.96 |
| EDM | 23.83 | 6.868 | 36.38 |
| EDT | 35.00 | 2.003 | 37.96 | where the zoom lens system comprises lens elements L1 and L2 having surfaces S1 and S4 and surface radii R1 and R4, $d_1$ to $d_3$ are the axial distances, the index of refraction is given by Nd, the dispersion is defined by the Abbe No. as given by ν, FL is the overall focal length of the zoom lens system for the wide angle photography (EDW), the middle position (EDM) and the telephoto end (EDT).

3. A zoom lens system comprising in order from the object and to the image end a front meniscus lens element of negative power and a rear meniscus lens element of positive power, the front and rear meniscus lens elements being shifted along an optical axis of the zoom lens system to change a relative axial distance between the front and rear meniscus lens elements so as to achieve zooming continuously from a wide angle photographic end to a telephotographic end, the zoom lens system satisfying the following condition:

$$-1.85 < f_1/f_2 < -1.5$$

where $f_1$ and $f_2$ are the focal length of the front and rear meniscus lenses, respectively, wherein said rear meniscus lens element has an object end aspheric surface and an image end aspheric surface, each aspheric surface being defined by the following relationship:

$$X = Cy^2/(1 + \sqrt{1-(1+K)C^2y^2}) + a1y^4 + a2y^6 + a3y^8 + a4y^{10}$$

where X is the surface sag at a semi-aperture distance y from the optical axis X of the lens system, C is the curvature of a lens surface at the optical axis X equal to the reciprocal of the radius at the optical axis, K is a conic constant, and a1–a4 are aspheric coefficients, said zoom lens system being scaled to an image frame of 24×36 mm substantially as follows:

| Element | | Radius of Curvature (mm) | Axial Distance Between Surfaces (mm) | Nd | υ |
|---|---|---|---|---|---|
| L1 | S1 | $R_1 = 37.406$ | | 1.49116 | 57.6 |
|    |    |                | $d_1 = 1.5$ |  |  |
|    | S2 | $R_2 = 10.025$ | | | |
|    |    |                | $d_2 = $ variable |  |  |
| L2 | S3 | $R_3 = 4.207$  | | 1.49116 | 57.6 |
|    |    |                | $d_3 = 2.270$ |  |  |
|    | S4 | $R_4 = 6.759$  | | | |

-continued

| Aspheric Surface: S1, S2, S3 and S4 Aspheric Parameters: | | | | |
|---|---|---|---|---|
| | S1 | S2 | S3 | S4 |
| C  | 0.02674 | 0.09975 | 0.23770 | 0.14795 |
| K  | 3.40389 | −0.22785 | 1.28056 | 6.74359 |
| a1 | −0.48894 × 10$^{-4}$ | 0.10231 × 10$^{-3}$ | −0.93197 × 10$^{-3}$ | 0.24192 × 10$^{-2}$ |
| a2 | −0.96192 × 10$^{-7}$ | −0.12487 × 10$^{-5}$ | −0.18598 × 10$^{-3}$ | −0.25293 × 10$^{-2}$ |
| a3 | 0 | −0.70536 × 10$^{-8}$ | 0.61481 × 10$^{-5}$ | 0.13952 × 10$^{-2}$ |
| a4 | 0 | 0 | −0.46908 × 10$^{-5}$ | −0.24267 × 10$^{-3}$ |

| Zooming Parameters: | | | |
|---|---|---|---|
| | FL (mm) | $d_2$ | Ld |
| EDW | 26.00 | 10.62 | 44.88 |
| EDM | 32.96 | 6.58  | 45.14 |
| EDT | 45.00 | 2.53  | 48.54 | where the zoom lens system comprises lens elements L1 and L2 having surfaces S1 and S4 and surface radii R1 and R4, $d_1$ to $d_3$ are the axial distances, the index of refraction is given by Nd, the dispersion is defined by the Abbe No. as given by υ, FL is the overall focal length of the zoom lens system for the wide angle end (EDW), the middle position (EDM) and the telephoto end (EDT).

4. A zoom lens system as defined in claim 3, wherein said front lens element has an image end aspheric surface defined by the following relationship:

$$X = Cy^2/(1 + \sqrt{1-(1+K)C^2y^2}) + a_1y^4 + a_2y^6 + a_3y^8 + a_4y^{10}$$

where X is the surface sag at a semi-aperture distance y from the optical axis X of the zoom lens system, C is the curvature of a lens surface at the optical axis X equal to the reciprocal of the radius at the optical axis, K is a conic constant, and a1–a2 are aspheric coefficients.

* * * * *